Patented July 5, 1932

1,865,832

UNITED STATES PATENT OFFICE

HEINZ H. CHESNY, OF LOS ANGELES, CALIFORNIA, ASSIGNOR TO AMERICAN POTASH & CHEMICAL CORPORATION, OF TRONA, CALIFORNIA, A CORPORATION OF DELAWARE

PROCESS OF PRECIPITATING SODIUM BICARBONATE FROM SOLUTIONS IN FORM OF COARSE CRYSTALS

No Drawing.  Application filed January 21, 1929. Serial No. 333,982.

This invention relates to a method of producing sodium bicarbonate in a coarse crystalline form.

In the manufacture of soda ash, it is common practice to precipitate sodium bicarbonate from the solution in order to form a material which can be calcined into the soda ash. As ordinarily carried out, the precipitation of the sodium bicarbonate results in the bicarbonate being precipitated in fairly small crystals. When these crystals of the bicarbonate are calcined, correspondingly small particles of soda ash are produced which form a dense body being of comparatively high apparent density. In this form, the soda ash is not as readily soluble as is the case of a lighter product. Moreover, when sodium bicarbonate is precipitated from impure solutions, the proportion of moisture which is included in the precipitate, increases inversely as the size of the crystals and since this moisture contains impurities of the solution, the purity of bicarbonate crystal varies inversely as the size of the crystal. This also of course, affects the purity of any soda ash produced from these crystals.

I have discovered that the size of the crystal and moisture content of crystals of moist sodium bicarbonate precipitated from impure salt solutions can be governed by the quantity of salt in solution. I have found that the larger the concentration of salt in the solution from which the bicarbonate is precipitated, the smaller the crystal size and larger the moisture content of the crystal mass. Accordingly, I devise a process by which crystals of bicarbonate of large size and low moisture content are produced by maintaining the salt content of the solution, from which the bicarbonate is precipitated, within certain limits.

The invention will best be understood from a description of the preferred form or example of a process for precipitating sodium bicarbonate from the solutions which embodies the present invention.

The solutions in which bicarbonate is precipitated should contain between 50 and 90 grams per liter of sodium chloride, and between 150 and 220 grams per liter of sodium sulfate. It is found that when there is this concentration of the salt in the solution, the crystals of bicarbonate precipitated are of better form and larger size than is otherwise the case.

The amount of sodium carbonate in the solution to be carbonated to precipitate sodium bicarbonate should generally be between 150 and 200 grams per liter.

Solutions of the above type may be obtained in various manners, from brines of Owen's or Searle's Lake, California, by suitable processing the brines, or can be artificially prepared in any desired manner.

In order to obtain the large crystals and the low moisture content, comparatively high temperatures of treatment should be employed. The solution, for example, should be carbonated with a carbon dioxide gas at temperatures between 46° and 76° C. Higher temperatures of treatment are to be avoided because of the increasing solubility of the sodium bicarbonate at high temperatures, decreasing the yield of the process. The crystals of smaller size are formed when lower temperatures of treatment are used. The method of carbonating the solution consists in passing carbondioxide bearing gas through the solution, while maintaining a partial pressure in carbondioxide bearing gas, preferably above five pounds per square inch, at least through that portion of the solution in which the sodium bicarbonate is being precipitated. The partial pressure of the carbon dioxide is described as above the before mentioned limit in order that the formation of sesqui-carbonates will be inhibited. These conditions are fully described in my copending application for Letters Patents entitled "Process of forming sodium bicarbonate", Serial No. 333,986, filed January 21, 1929.

By the process herein described, large crystals of sodium bicarbonate will be formed which are in the major part in the form of stellatic clusters. From this form of crystal, the moisture content may be removed by filtration or centrifugation to an especially high extent. For example, the moisture content of these crystals, after the sludge of the crystals has been passed to a conventional filter, is found to be between 5 to 12 percent.

It appears that the size of sodium bicarbonate crystals which are precipitated is dependent upon the composition of the solution and especially upon the effect of other sodium salts upon the ionization. The presence of salts such as sodium chloride and sodium sulfate decreases the solubility of the sodium carbonate in the solution. Sodium bicarbonate is soluble at 40° C. to the extent of 50 to 30 grams per liter when the salt concentration is 150 grams of sodium sulfate and 50 grams of sodium chloride to 220 grams of sodium sulfate and 90 grams of sodium chloride. At 60°, the solubility of the bicarbonate is from 90 to 50 grams per liter with the same corresponding salt concentrations.

While the process of forming sodium bicarbonate herein described is well adapted to carry out the objects of the present invention, it should be understood that various modifications and changes may be made without departing from the invention and the invention includes all such modifications and changes as come within the scope of the following claims.

I claim:

1. A process of obtaining coarse crystals of sodium bicarbonate which comprises, subjecting solutions of sodium carbonate to the action of carbon dioxide bearing gas, the solutions containing from 50 to 90 grams per liter of sodium chlorid and 150 to 220 grams per liter of sodium sulphate, the carbonation being carried out at a temperature between 46° and 76° C., and the carbon dioxide bearing gas being maintained under pressure.

2. A process of obtaining sodium bicarbonate which after separation from its mother liquor contains between 5 and 12 percent of moisture which comprises, carbonating a solution containing besides sodium carbonate, such quantities of sodium chlorid and sodium sulphate that the sum of the sodium chlorid concentration and one half of the sodium sulphate concentration is less than 200 grams per liter and that the sodium sulphate concentration is always in excess of 150 grams per liter, the carbonation being carried out at a temperature between 46° and 76° C., and the carbon dioxide bearing gas being maintained under pressure.

3. A process of obtaining sodium bicarbonate which after separation from its mother liquor contains between 5 and 12 percent of moisture which comprises, carbonating the solution containing, besides sodium carbonate, at least 150 grams per liter of sodium sulphate and such quantities of sodium chloride that the sum of the sodium chloride concentration and one half of the sodium sulphate concentration is less than 200 grams per liter, while maintaining the temperature of the solution during carbonation between 46° and 76° C., and while maintaining a partial pressure above approximately five pounds per square inch of carbon dioxide on that portion of the solution in which the sodium bicarbonate is being precipitated.

Signed at Los Angeles, Calif., this 9th day of Jan. 1929.

HEINZ H. CHESNY.